United States Patent [19]

Thompson

[11] Patent Number: 5,285,716

[45] Date of Patent: Feb. 15, 1994

[54] SPRING BRAKE ASSEMBLY HAVING TAMPER-RESISTANT WELDED HOUSING AND METHOD FOR MAKING SAME

[75] Inventor: Laurence D. Thompson, Fresno, Calif.

[73] Assignee: TSE Brakes, Inc., Fresno, Calif.

[21] Appl. No.: 949,186

[22] Filed: Sep. 22, 1992

[51] Int. Cl.$^5$ .............................................. F01B 7/00
[52] U.S. Cl. ........................................ 92/63; 92/98 R; 92/96; 92/169.1; 228/184; 29/454
[58] Field of Search ................. 92/48, 63, 96, 98 R, 92/101, 130 A, 169.1; 228/184; 29/454

[56] References Cited

U.S. PATENT DOCUMENTS

| | | | |
|---|---|---|---|
| 3,675,308 | 7/1972 | Ziegler | 29/454 |
| 4,850,263 | 7/1989 | Rumsey et al. | 92/63 |
| 4,925,698 | 1/1989 | Petrie | 29/454 |
| 4,960,036 | 10/1990 | Gummer et al. | 92/48 |
| 5,002,164 | 3/1991 | Bowyer | 92/63 |
| 5,062,455 | 11/1991 | Schurter et al. | 92/98 R |
| 5,067,391 | 11/1991 | Choinski et al. | 92/48 |
| 5,105,727 | 4/1992 | Bowyer | 92/63 |
| 5,193,432 | 3/1993 | Smith | 92/63 |

FOREIGN PATENT DOCUMENTS 2000225 1/1979 United Kingdom ................ 92/63

Primary Examiner—Thomas E. Denion
Attorney, Agent, or Firm—Robbins, Berliner & Carson

[57] ABSTRACT

Disclosed is an improved spring brake assembly, and a method for making same, which is particularly resistant to unauthorized disassembly and its consequent hazards. A diaphragm is locked between two opposing portions of a housing. The two opposing portions of the housing are both made of steel and are welded rather than clamped to one another. The weld is performed in such a way that the diaphragm is not burnt or otherwise damaged by the welding process. The opposing portions are configured as a cylindrical coupling between a male member having an inwardly extending lip, and a female member preferably having an inner circumferential ledge, which cooperate to trap the periphery of the diaphragm at an end of the coupling remote from the weld.

18 Claims, 2 Drawing Sheets

SPRING BRAKE ASSEMBLY HAVING TAMPER-RESISTANT WELDED HOUSING AND METHOD FOR MAKING SAME

TECHNICAL FIELD

The present invention relates generally to fluid-operated braking systems, and more particularly to spring-operated brake actuators which cause a substantial braking force to be applied to the brakes of a vehicle in the event of a loss of pressurized air in the vehicle's air-operated service brake system.

BACKGROUND ART

A common type of spring-operated brake actuator used on heavy trucks and other commercial vehicles utilizes a powerful compression spring to provide the required braking force when the air pressure inside a pressurized chamber falls below a predetermined minimum, for example when the vehicle is parked or there is a malfunction in the air-operated service brake system. The spring is located between an end wall of a brake head housing and the pressurized chamber, with a flexible diaphragm extending across the interior of the housing and dividing it into an unpressurized spring chamber and a pressurized air chamber. The force exerted on the diaphragm by the pressurized air exerts a counter-force on the spring, which holds it in a compressed position inside the spring chamber. When the pressure inside the air chamber drops, the unbalanced force exerted by the compression spring is transmitted through the diaphragm to an actuator rod that extends from the pressurized side of the diaphragm to the exterior of the actuator. In a so-called "double diaphragm" spring brake actuator, a service brake housing is provided in line with the spring brake housing, and a second diaphragm inside the service brake housing transits a modulated force to the actuator rod during normal operation of the service brake system.

Because the spring brake assembly is a critical safety system, it has to be designed and manufactured for exceptional reliability. Moreover, because the compression spring inside the spring actuator must exert a sufficient force to apply a maximum braking force to the vehicle independent of any external air pressure assistance from the service brake system, the spring in its compressed state stores sufficient kinetic energy to be lethal if the spring brake housing is opened without first taking adequate precautions to secure the spring in its compressed state or to release the stored energy in a controlled manner.

It is conventional to fabricate the spring brake housing containing the compression spring and diaphragm in two opposing sections (an aluminum adapter housing and a steel cap) separated by the periphery of the diaphragm, with the two opposing sections being clamped together with sufficient force to maintain an air-tight seal between the diaphragm and the housing. Since unauthorized opening of the housing is potentially dangerous to the inexperienced mechanic, and since unauthorized re-sealing using defective seals or improper procedures could result in a poor diaphragm seal or other internal defect, it is also conventional to discourage unauthorized access, disassembly, and reassembly of the housing by appending a warning label to the housing and using a clamping means which is tamper-resistant or at least tamper- o evident, so that a new clamping means, not readily available to unauthorized personnel, is required before the housing can be reassembled.

Despite these relatively obvious safety precautions, the known clamping means can be removed by simple handtools and the warning labels are exposed to dirt and road hazards and are thus effective only when the assembly is relatively new and not likely to require inspection or repair. Thus, there is a need for an improved spring brake housing that is even less prone to unauthorized disassembly and its consequent hazards.

Another disadvantage of the clamping means used in the prior art is that they present cavities and crevices in which moisture and debris can accumulate, which may eventually cause corrosion of the housing in the vicinity of the seal between the housing and the diaphragm, which in turn may lead to premature failure of the seal, or even of the diaphragm itself, requiring early replacement or rebuilding of the entire spring brake assembly.

As an alternative to a separate conventional clamping means, it has also been proposed to form an annular metal retaining member as an integral part of the steel cap, which is then deformed beyond its elastic limit around an annular flange on the aluminum adapter housing. However, such an alternative construction does not permit a major structural component of the spring brake assembly (the steel cap) to be reused, and is thus relatively expensive and environmentally undesirable.

SUMMARY OF INVENTION

Accordingly, it is an overall object of the present invention to provide an improved spring brake assembly, and a method for making same, which is particularly resistant to unauthorized disassembly and its consequent hazards. More specifically, this and other related objects are achieved by a novel construction of a spring brake assembly in which the two opposing portions of the housing both made of steel and are welded rather than clamped or crimped to one another.

In accordance with the method aspects of the invention, the weld is performed in such a way that a diaphragm trapped between the two opposing portions is not burnt or otherwise damaged by the welding process.

In accordance with the structural aspects of the invention, the opposing portions are configured as a cylindrical coupling between a male member having an inwardly extending lip, and a female member preferably having an inner circumferential ledge, which cooperate with each other to trap the periphery of the diaphragm at an end of the coupling remote from the weld.

DETAILED DESCRIPTION

Figure 1:
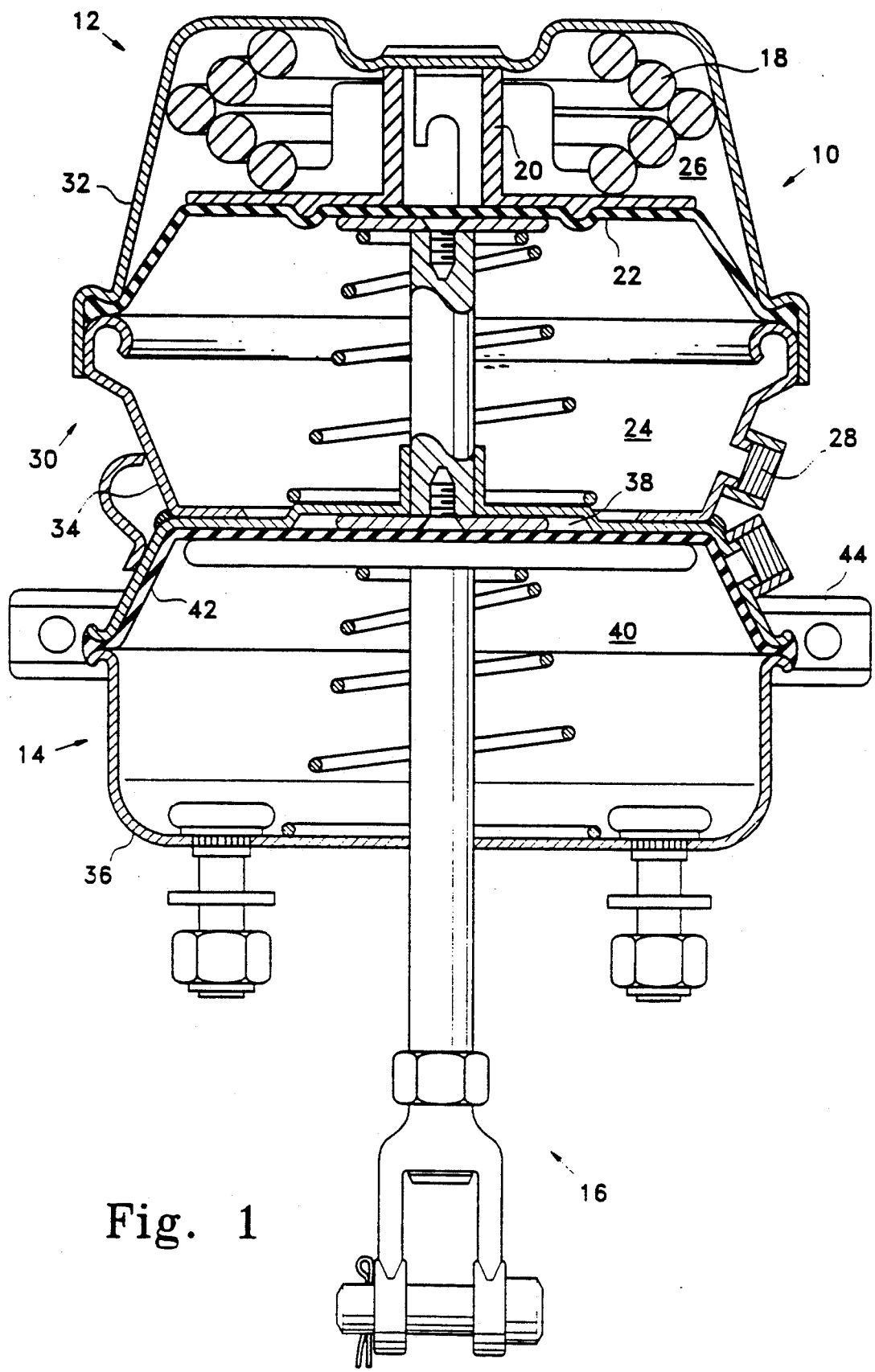
FIG. 1 is a cross sectional view of a double diaphragm spring brake actuator constructed in accordance with the present invention.

Referring now to FIG. 1, it will be seen that a double diaphragm spring brake actuator 10 constructed in accordance with the present invention shares many components and constructional details with prior brake actuators. In particular, it includes a spring actuator portion 12 and an adjacent service brake actuator portion 14 mounted coaxially with respect to an actuator rod 16. At the end of Spring actuator portion 12 remote from service brake actuator portion 14 is compression spring 18 which is normally held in a compressed state by retainer 20 which is in contact with the upper surface of diaphragm 22. Upper diaphragm 22 in turn divides the spring actuator portion 12 into a pressurized air chamber 24 and a unpressurized spring chamber 26. Air pressure, introduced via upper inlet 28, forces the upper diaphragm 22 against retainer 20 which in turn presses against the free end of compression spring 18.

Normally, the air pressure inside pressurized air chamber 24 is maintained at the full operating pressure of the vehicle's service brake system, and as a result, compression spring 18 is free to expand to an extended position only when the vehicle is parked, or as a result of a malfunction within the service brake system. It will be appreciated, in either event, compression spring 18 must exert a sufficient force on actuator rod 16 to operate the vehicle's brake (not shown) without any assistance from the air pressure that normally operates the service braking system. As a result, it is extremely hazardous to inspect or replace upper diaphragm 22 without first securing compression spring 18 and retainer 20 in their compressed state in which the vehicle's brake is fully released.

For ease of fabrication, upper housing 30 of double diaphragm spring brake actuator 10 is conventionally fabricated from two opposing subhousings, including a cap portion 32 and a base portion 34. Base portion 34 conventionally also functions as the cover portion for service subhousing 36, and cooperates therewith to form service brake actuator portion 14, which is also divided into an upper pressurized service chamber 38 and a lower unpressurized service chamber 40 by a lower diaphragm 42.

The service brake actuator portion 14 is not an essential part of the present invention, and its function and fabrication will not be described in further detail, except to mention that lower diaphragm 42 is clamped in conventional fashion between outwardly flanged opposing surfaces of base portion 34 and service subhousing 36, using a conventional clamping means 44.

Figure 2:
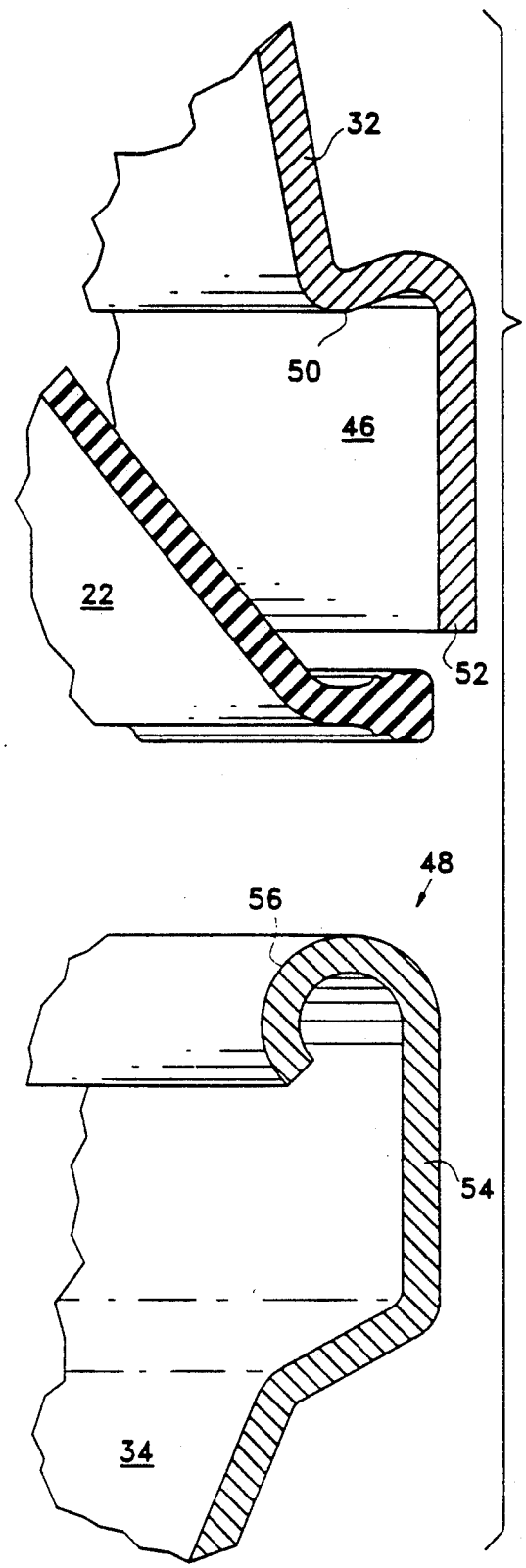
FIG. 2 is an exploded cut away of view of a peripheral portion of the spring brake diaphragm of FIG. 1 and the adjoining portions of the coupling between the two subhousings.
Figure 3:
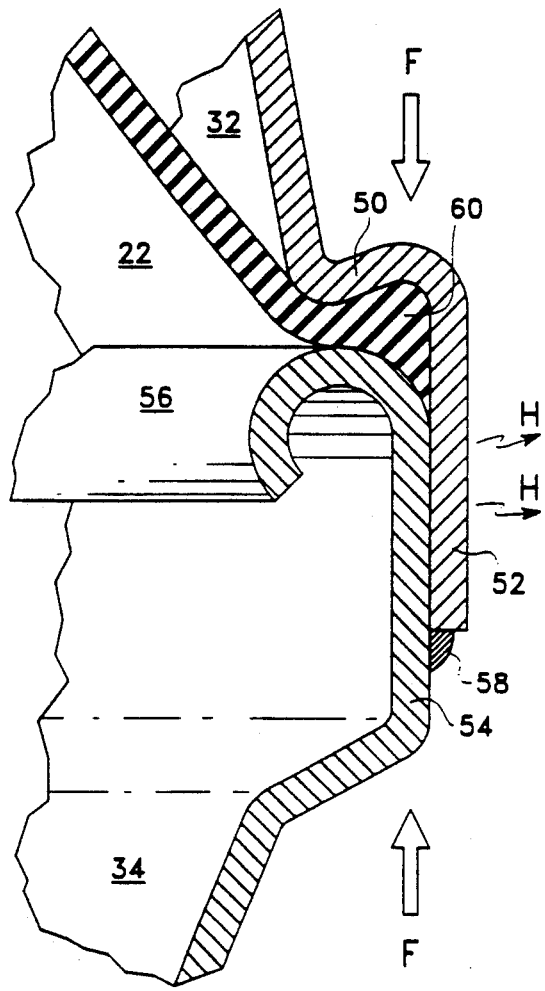
FIG. 3 shows the components of FIG. 2 in their assembled configuration, with a peripheral weld securing the two coupling portions to each other.

Reference should now be made to spring actuator portion 12, and more particularly to the periphery of upper diaphragm 22 where cap portion 32 meets base portion 34, which is shown in greater detail in FIGS. 2 and 3. In particular, in accordance with the present invention, cap portion 32 and base portion 34 are each fabricated using conventional sheet metal forming techniques from steel having appropriate specifications and dimensions for the intended application, for example, 11-12 gauge steel conforming to ASTM A-569-91A and having a thickness of approximately 0.125" (3 mm). Cap portion 32 is terminated at its open lower end by an integrally formed female coupling portion 46 and base portion 34 is terminated at its open upper end by an integrally formed male coupling portion 48, which matingly fits inside female coupling portion 46. Female coupling portion 46 includes an outwardly extending circumferential ledge 50 from which further extends in the longitudinal direction (relative to the axis defined by actuator rod 16) an outer cylinder 52. Male coupling portion 48 includes an inner cylinder 54 which is terminated by an inwardly extending lip 56. The inwardly extending lip 56 is preferably rolled or curled during the fabrication of base portion 34, to provide a rounded guide for upper diaphragm 22, which avoids the possibility of the lower surface of upper diaphragm 22 coming into contact with a sharp edge when pressure is released from pressurized air chamber 24 and the central portion of upper diaphragm 22 is pushed downward in the direction of actuator rod 16 by the energy stored in compression spring 18. The rounded shape also provides additional strength and rigidity to the base portion 34, permitting a lighter gauge of steel to be used in the construction of spring actuator portion 12.

When inner cylinder 54 is inserted into outer cylinder 52 with the periphery of upper diaphragm 22 secured between outwardly extending circumferential ledge 50 and inwardly extending lip 56, cap portion 32 is secured to base portion 34 by means of a full or partial peripheral MIG weld 58 located at the juncture between the open end of outer cylinder 52 and a corresponding outer surface of inner cylinder 54. This novel welded construction not only secures spring actuator portion 12 against unauthorized access to its inner components, but also maintains a sufficient pressure on the enlarged periphery of upper diaphragm 22 to conform its original cross section to the generally key-shaped space 60 defined by the opposing surfaces of outwardly extending circumferential ledge 50, outer cylinder 52 and inwardly extending lip 56, so as to maintain an air-tight seal between the upper diaphragm 22 and the base portion 34 which together cooperate to define the normally pressurized air chamber 24.

Since upper diaphragm 22 is typically formed of NBR rubber from Goodyear or other resilient impermeable organic polymer which has a relatively low melting point and is easily damaged by excess heat in excess of 300° F. (150° C.), in accordance with an important aspect of the invention, as indicated symbolically in FIG. 3 by curly arrows H, heat from peripheral weld 58 is removed the female coupling portion 46 and male coupling portion 48 before it can reach the upper diaphragm 22 via the relatively conductive steel forming the outer cylinder 52 and inner cylinder 54. To further facilitate the desired transfer of heat, the lengths of outer cylinder 52 and inner cylinder 54 are preferably such that peripheral weld 58 is at least 0.5" (12 mm) from upper diaphragm 22, and a suitable water-chilled cooling fixture (not shown) is placed in intimate contact with the outer surface of outer cylinder 52 to draw away heat from the vicinity of the periphery of upper diaphragm 22. At the same time, as shown symbolically by the straight arrows F, a compression force of approximately 5000 pounds (2400 kg) is applied between the two subassemblies during the formation of peripheral weld 58 until cap portion 32 has been welded to base portion 34, to maintain the periphery of upper diaphragm 22 in a distorted shape conforming to the generally key-shaped space 60 and thereby maintain the required air-tight seal between upper diaphragm 22 and base portion 34.

Preferably the pressurized air introduced into pressurized air chamber 24 through upper inlet 28 is the same dried and filtered air as is used to operate the service brake actuator portion 14. When the air is exhausted, the resultant circulation will dry and purge the interior of pressurized air chamber 24, preventing any rust formation on unprotected inner surfaces, particularly in the vicinity of peripheral weld 58.

By forming base portion 34 of two welded together steel stampings which together replace the unitary aluminum center section used in conventional double diaphragm spring brake actuators, an improved part results which is less likely to "explode", crack or degrade from road salts.

Although peripheral weld 58 permanently secures pressurized air chamber 24 against unauthorized access, it is a relatively simple task for a well-equipped machine shop to grind away the welded joint, or to separate the weld from outer cylinder 52, for example by means of a lathe, after compression spring 18 has been secured in its fully compressed condition. In that event, both cap portion 32 and base portion 34 may be recycled, and assembled into a fully reconditioned double diaphragm spring brake actuator 10.

What is claimed is:

1. A method for making a brake actuator having an actuator housing containing an actuator chamber, a flexible diaphragm extending across said actuator chamber to define a first region and second region, and means inside said second region between said housing and said diaphragm for exerting an actuation force on said diaphragm in the direction of said pressurized region, said method comprising the steps:
    terminating a lower peripheral portion of a first subhousing with a radially outwardly extending ledge from which downwardly extends a first cylindrical flange, a lower surface of said outwardly extending ledge and an inner surface of said first cylindrical flange cooperating to define an inside surface of a female coupling;
    terminating an upper peripheral portion of a second subhousing with a radially inwardly extending lip at an upper end of a second cylindrical flange, an outer surface of said second cylindrical flange and an upper surface of said inwardly extending lip cooperating to define an outside surface of a male coupling adapted to fit within said inside surface of said female coupling;
    positioning said first and second subhousings coaxially about an axis with the outside surface of the male coupling entering the inside surface of the female coupling and with a periphery of said diaphragm located between the upper surface of said lip and the lower surface of said ledge;
    pressing said male coupling into said female coupling until the periphery of the diaphragm is squeezed between the upper surface of the lip and the lower surface of the ledge; and
    welding a lower end of the female coupling downwardly remote from said lip to an exposed lower portion of the male coupling remote from said ledge, while the periphery of the diaphragm remains squeezed between said ledge and said lip.

2. The method of claim 1 wherein said welding step is performed at a distance sufficiently remote from said ledge and said lip to avoid heating the peripheral region of the diaphragm above a predetermined temperature.

3. The method of claim 2, where said predetermined temperature is the temperature at which the diaphragm material is permanently deformed.

4. The method of claim 2 wherein said welding step further comprises removing heat from the female coupling at a point intermediate the weld and the periphery of the diaphragm.

5. The method of claim 4 wherein said welding step further comprises MIG welding the exposed peripheral portion of the male coupling to the lower end of the female coupling.

6. The method of claim 2, wherein said distance is determined by the thickness of the periphery of the diaphragm and the length of said first cylindrical flange between said exposed end and said ledge.

7. The method of claim 2, wherein said distance is at least $\frac{3}{8}''$.

8. The method of claim 7, wherein said distance is approximately $\frac{1}{2}''$.

9. The method of claim 2, wherein said first and second subhousings are steel and welding step utilizes MIG welding.

10. The method of claim 1, wherein said lip is formed with a rounded profile extending inwardly and downwardly away from said diaphragm.

11. A brake actuator comprising:
    a subhousing having a first peripheral portion surrounding an axis and terminated by an outwardly extending circumferential ledge from which longitudinally extends a first cylindrical flange to thereby define define an inside surface of a female coupling;
    a second subhousing having a second peripheral portion also surrounding said axis and terminated by a second cylindrical flange from which extends an inwardly extending lip to thereby define an outside surface of a male coupling adapted to fit inside said inside surface of the female coupling, said first and second subhousings being positioned coaxially about said axis with the male and female couplings matingly engaged to thereby form an actuator housing containing an actuator chamber;
    a diaphragm extending across said actuator chamber and secured between said ledge and said lip to thereby separate said chamber into a first region and second region;
    means inside said first region between said actuator housing and said diaphragm for exerting an actuation force on said diaphragm in the direction of said first region; and
    a circumferential weld between an exposed end of said first cylindrical flange longitudinally spaced from said ledge and an adjacent portion of the outside surface of said second cylindrical flange for maintaining said male and female couplings in permanent engagement with each other with the periphery of the diaphragm trapped between said ledge and said lip.

12. The actuator of claim 11, wherein the periphery of the diaphragm has an enlarged cross section and respective portions of said lip, said ledge and said outer cylindrical flange cooperate to define a key-shaped space for accommodating the periphery of the diaphragm.

13. The actuator of claim 12, wherein said lip has a rounded profile extending inwardly and downwardly away from said diaphragm.

14. The actuator of claim 11, wherein said diaphragm is formed of a polymeric material which would be permanently distorted if subjected to temperatures above 300° F.

15. The actuator of claim 11, wherein
    said means for exerting an actuation force is a compression spring and said actuator is a spring actuator part of a two diaphragm actuator;

said two diaphragm actuator also includes a service actuator having a second diaphragm contained within a second chamber;

said second chamber is defined by respective surfaces of a third subhousing and a selected one of said first and second subhousings; and said third subhousing is removably engaged to said selected subhousing by a conventional clamping means.

16. The actuator of claim 11, wherein the periphery of the diaphragm is separated from said circumferential weld by a predetermined minimum distance.

17. The actuator of claim 16, wherein said distance is at least ⅜".

18. The actuator of claim 17, wherein said distance is approximately ½".

* * * * *